's010904564B2

United States Patent
Yea et al.

(10) Patent No.: US 10,904,564 B2
(45) Date of Patent: Jan. 26, 2021

(54) METHOD AND APPARATUS FOR VIDEO CODING

(71) Applicant: TENCENT AMERICA LLC, Palo Alto, CA (US)

(72) Inventors: Sehoon Yea, Palo Alto, CA (US); Shan Liu, San Jose, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/414,290

(22) Filed: May 16, 2019

(65) Prior Publication Data

US 2020/0021844 A1 Jan. 16, 2020

Related U.S. Application Data

(60) Provisional application No. 62/729,389, filed on Sep. 10, 2018, provisional application No. 62/727,372, filed on Sep. 5, 2018, provisional application No. 62/699,031, filed on Jul. 17, 2018, provisional application No. 62/696,217, filed on Jul. 10, 2018.

(51) Int. Cl.
| | |
|---|---|
| *H04N 19/567* | (2014.01) |
| *H04N 19/126* | (2014.01) |
| *G06T 9/00* | (2006.01) |
| *H04N 19/23* | (2014.01) |

(52) U.S. Cl.
CPC ......... *H04N 19/567* (2014.11); *H04N 19/126* (2014.11); *H04N 19/23* (2014.11)

(58) Field of Classification Search
None
See application file for complete search history.

(56) References Cited

U.S. PATENT DOCUMENTS

| | | | |
|---|---|---|---|
| 10,223,810 B2* | 3/2019 | Chou | H04N 19/54 |
| 2019/0081638 A1* | 3/2019 | Mammou | H03M 7/6035 |
| 2019/0087979 A1* | 3/2019 | Mammou | H04N 19/597 |
| 2019/0114830 A1* | 4/2019 | Bouazizi | G06F 3/013 |
| 2019/0318488 A1* | 10/2019 | Lim | G06K 9/00208 |

(Continued)

OTHER PUBLICATIONS

Tulvan, Christian et al. "Use Cases for Point Cloud Compression (PCC)" International Organisation for Standardisation Organisation Internationale De Normalisation; ISO/IEC JTC1/SC29/WG11; Coding of Moving Pictures and Audio; Jun. 2016, Geneva, CH.

(Continued)

*Primary Examiner* — Talha M Nawaz
(74) *Attorney, Agent, or Firm* — Oblon, McClelland, Maier & Neustadt, L.L.P.

(57) ABSTRACT

A method of processing point cloud data at a decoder can include receiving three dimensional (3D) coordinates of a set of points of a point cloud including first points and a current point. Each of the first points can be associated with a reconstructed attribute value. A group of neighboring points of the current point can be determined from the first points. An attribute distance for each of the neighboring points can be determined based on the reconstructed attribute values of the neighboring points. An attribute prediction of the current point can be determined based on the attribute distances of the neighboring points.

20 Claims, 11 Drawing Sheets

(56) References Cited

U.S. PATENT DOCUMENTS

| | | | |
|---|---|---|---|
| 2019/0318519 A1* | 10/2019 | Graziosi | H04N 19/186 |
| 2019/0346271 A1* | 11/2019 | Zhang | G01S 17/86 |
| 2019/0394496 A1* | 12/2019 | Tourapis | H04N 19/91 |
| 2020/0021847 A1* | 1/2020 | Kim | H04N 19/597 |
| 2020/0107033 A1* | 4/2020 | Joshi | H04N 19/20 |
| 2020/0143568 A1* | 5/2020 | Lasserre | G06T 9/40 |

OTHER PUBLICATIONS

Mekuria, Rufael et al. "Requirements for Point Cloud Compression" International Organisation for Standardisation Organisation Internationale De Normalisation; ISO/IEC JTC1/SC29/WG11; Coding of Moving Pictures and Audio; Feb. 2016, Geneva, CH.

Mammou, Khaled. "PCC Test Model Category 3 v 1" International Organisation for Standardisation Organisation Internationale De Normalisation; ISO/IEC JTC1/SC29/WG11; Coding of Moving Pictures and Audio; Jan. 2018, Republic of Korea.

* cited by examiner

| Index | Truncated Unary |
|-------|-----------------|
| 0     | 0               |
| 1     | 10              |
| 2     | 110             |
| 3     | 1110            |
| 4     | 11110           |
| 5     | 11111           | ns in which:
METHOD AND APPARATUS FOR VIDEO CODING

INCORPORATION BY REFERENCE

This present disclosure claims the benefit of priority to a series of U.S. Provisional Application No. 62/696,217, filed on Jul. 10, 2018, 62/699,031, filed on Jul. 17, 2018, 62/727,372, filed on Sep. 5, 2018, and 62/729,389, filed on Sep. 10, 2018, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Three-dimensional (3D) representations of the world are enabling more immersive forms of interaction and communication, and also allow machines to understand, interpret and navigate the world. Point clouds have emerged as one of such 3D enabling representations. The Moving Picture Experts Group (MPEG) has identified a number of use cases associated with point cloud data, and developed corresponding requirements for point cloud representation and compression.

SUMMARY

Aspects of the disclosure provide methods and apparatuses for processing point cloud data. In an embodiment, a method of processing point cloud data at a decoder can include receiving three dimensional (3D) coordinates of a set of points of a point cloud including first points and a current point. Each of the first points can be associated with a reconstructed attribute value. A group of neighboring points of the current point can be determined from the first points. An attribute distance for each of the neighboring points can be determined based on the reconstructed attribute values of the neighboring points. An attribute prediction of the current point can be determined based on the attribute distances of the neighboring points.

In an embodiment, another method of processing point cloud data at a decoder can include receiving 3D coordinates of a set of points of a point cloud including first points and a current point. Each of the first points can be associated with a reconstructed attribute value. A group of neighboring points of the current point can be determined from the first points. An index can be associated with each of the reconstructed attribute values of the determined neighboring points. An index of a reconstructed attribute value selected from the reconstructed attribute values of the determined neighboring points can be received. The reconstructed attribute value having the received index can be determined to be an attribute prediction of the current point.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Point Cloud Compression Systems

1. Point Cloud Data

Point cloud data is used to represent a three-dimensional (3D) scene or object in some emerging applications such as immersive virtual reality (VR)/augmented reality (AR)/mixed reality (MR), automotive/robotic navigation, medical imaging, and the like. A point cloud includes a collection of individual 3D points. Each point is associated with a set of 3D coordinates indicating a 3D position of the respective point and a number of other attributes such as color, surface normal, opaque, reflectance, etc. In various embodiments, input point cloud data can be quantized and subsequently organized into a 3D grid of cubic voxels that can be described using an octree data structure. A resulting voxelized octree facilitates the traversal, search, and access of the quantized point cloud data.

A point cloud is a set of points in a 3D space, each with associated attributes, e.g. color, material properties, etc. Point clouds can be used to reconstruct an object or a scene as a composition of such points. They can be captured using multiple cameras and depth sensors in various setups, and may be made up of thousands and even billions of points in order to realistically represent reconstructed scenes.

Compression technologies are needed to reduce the amount of data required to represent a point cloud. As such, technologies are needed for lossy compression of point clouds for use in real-time communications and six Degrees of Freedom (6 DoF) virtual reality. In addition, technologies are sought for lossless point cloud compression in the context of dynamic mapping for autonomous driving and cultural heritage applications, etc. Further, standards are needed to address compression of geometry and attributes (e.g., colors and reflectance), scalable/progressive coding, coding of sequences of point clouds captured over time, and random access to subsets of the point cloud.

2. Coordinates Quantization

In an embodiment, coordinates of points in the input cloud data can first be quantized. For example, real number values of the coordinates may be quantized into integer values. After the quantization, more than one point may share a same position in some voxels. Those duplicate points optionally can be merged into a single point.

3. Geometry Coding Based on an Octree

Figure 1:
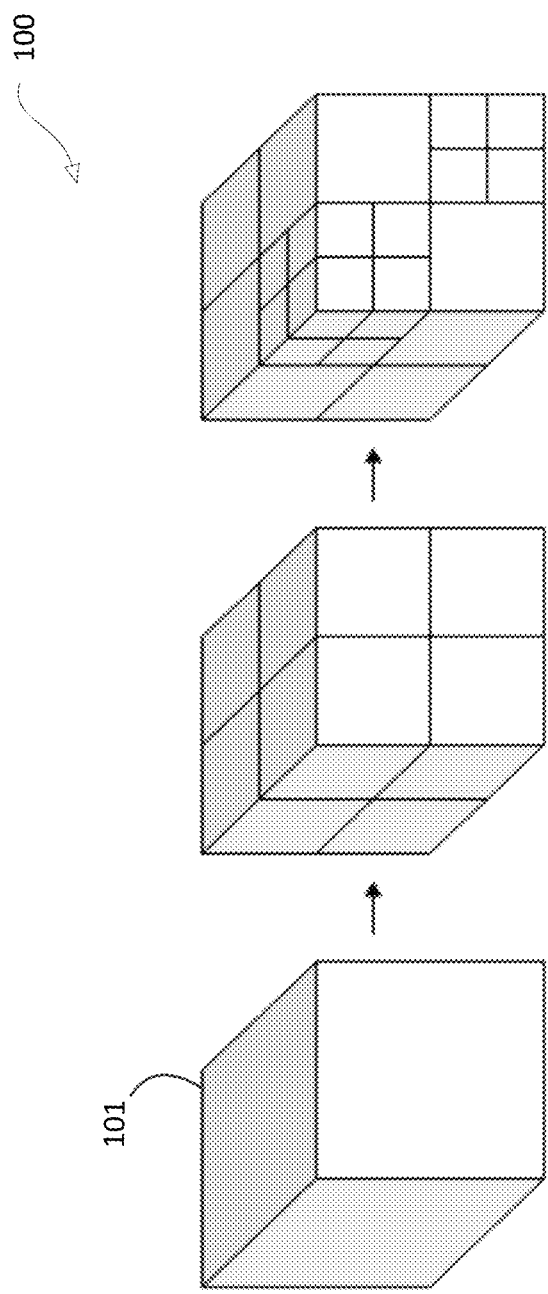
FIG. 1 shows a recursive subdivision process in accordance with an embodiment.

FIG. 1 shows a recursive subdivision process (100) in accordance with an embodiment. The process (100) can be performed to generate an octree structure to represent positions of a set of points in a point cloud. As shown, a cubical axis-aligned bounding box (101) containing the set of points is first defined. Then, the bounding box (101) is recursively subdivided to build the octree structure. As shown, at each stage, a current cube can be subdivided into 8 sub-cubes. An 8-bit code, referred to as an occupancy code, can be generated to indicate whether each of the 8 sub-cubes contains points. For example, each sub-cube is associated with a 1-bit value. If the sub-cube is occupied, the respective sub-cube has a bit value of 1; otherwise, the respective sub-cube has a bit value of 0. Occupied sub-cubes can be divided until a predefined minimum size of the sub-cubes is reached. A sub-cube of the minimum size is a voxel corresponding to the octree structure. A sequence of occupancy codes can thus be generated, and subsequently be compressed and transmitted from an encoder to a decoder. By decoding the occupancy codes (e.g., performing an octree decoding process), the decoder can obtain a same octree structure as the encoder, or an estimation of the octree structure.

3. Attribute Transfer

As a result of the octree generation or coding process, at the encoder side, a sub-cube with the minimum size may contain more than one point. Thus, a position corresponding to a voxel (e.g., a center of the respective sub-cube) may correspond to multiple sets of attributes from multiple points. In such a scenario, in an embodiment, an attribute transfer process can be performed to determine one set of attributes based on the multiple sets of attributes for the respective voxel. For example, an averaged attribute of a subset of nearest neighboring points can be used as an attribute of the respective voxel. Different methods may be employed in various embodiments for attribute transfer purposes.

4. Level of Detail (LOD) Generation

Figure 2:
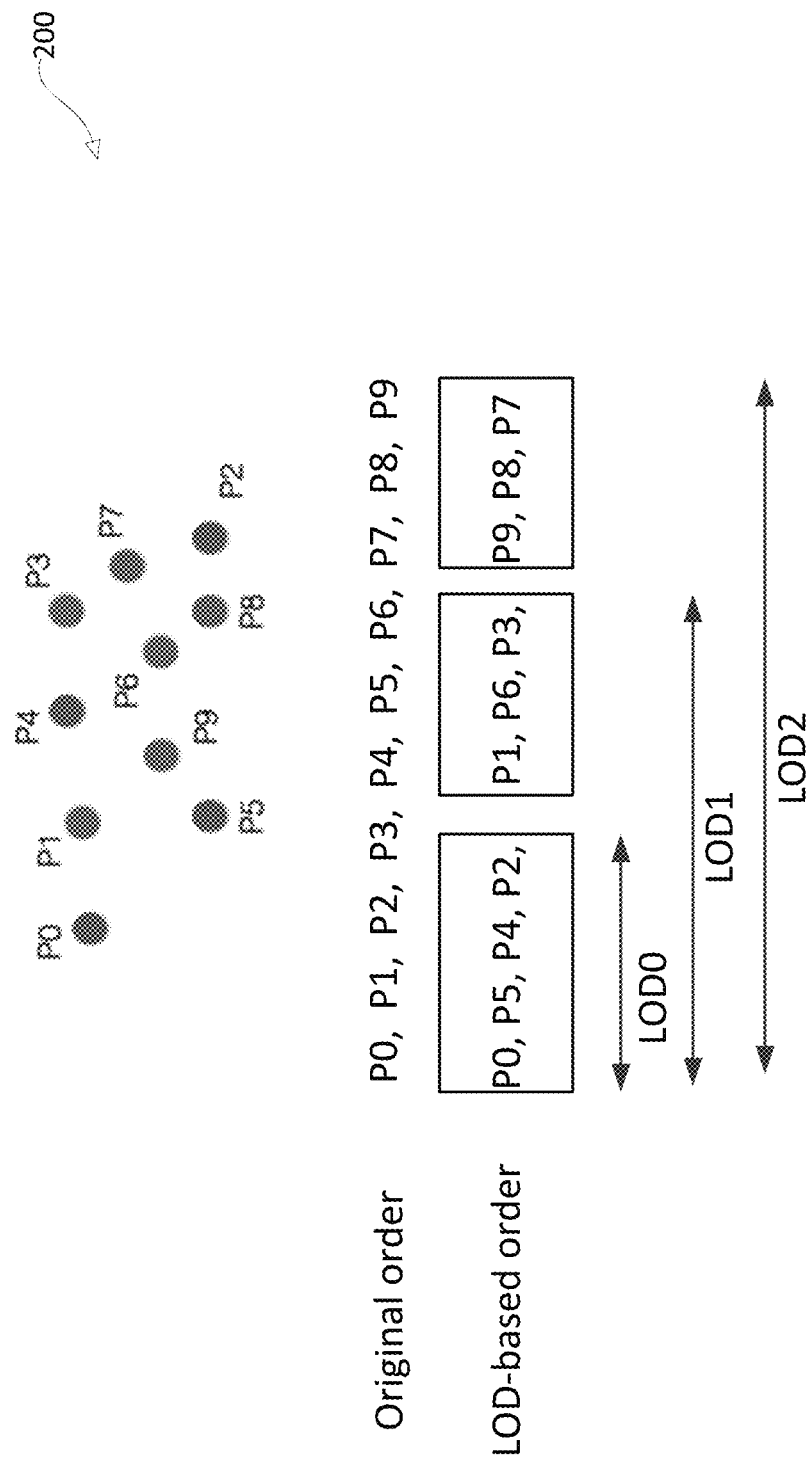
FIG. 2 shows a level of detail (LOD) generation process in accordance with an embodiment.

FIG. 2 shows a level of detail (LOD) generation process (200) in accordance with an embodiment. The process (200) can be performed on the quantized positions (e.g., voxel positions) ordered according to the octree decoding process. As a result of the process (200), the points can be re-organized or re-ordered into a set of refinement levels. The process (200) can be performed identically at the encoder and decoder. A subsequent attribute coding process can be performed at the encoder or decoder according to the order defined by the process (200) (referred to as the LOD-based order).

Specifically, FIG. 2 shows three LODs: LOD0, LOD1, and LOD2. A Euclidean distance, d0, d1, or d2, can be specified for LOD0, LOD1, and LOD2, respectively. A subset of points P0-P9 is included in each LOD. The distances between each pair of points in the respective LOD is larger than or equal to the respective Euclidean distance. The Euclidean distances can be arranged in a manner that $d0 > d1 > d2$. Under such arrangement, a higher refinement level includes fewer points that are farther from each other, and provides a coarser representation of the point cloud, while a lower refinement level includes more points closer to each other, and provides a finer representation of the point cloud.

As a result of the above LOD generation process (200), the points in an original order (octree decoding order) from P0 to P9 can be re-organized into an LOD-based order: P0, P5, P4, P2, P1, P6, P3, P9, P8, and P7.

5. Attributes Prediction

The attributes associated with the point cloud can be encoded and decoded in the order defined by the LOD generation process. For example, point by point, in the LOD-based order, an attribute prediction of each current point (a point currently under processing) can be determined by performing an attribute prediction process at the encoder and/or decoder. A similar attribute prediction process can be performed at the encoder and the decoder.

With the obtained attribute prediction, at the encoder, a residual signal can be generated by subtracting the attribute prediction value from a respective original attribute value of the current point. The residual signal can then, individually or in combination with other residual signals, be further compressed. For example, transform and/or quantization operations may be performed, and followed by entropy coding of resulting signals. The compressed residual signal can be transmitted to the encoder in a bit stream.

At the decoder, a residual signal can be recovered by performing an inverse of the coding process at the encoder for coding a residual signal. With the obtained attribute prediction and the recovered residual signal corresponding to the current point, a reconstructed attribute of the current point can be obtained. In a similar way, this reconstruction operation may take place at the encoder to obtain a reconstructed attribute.

Various attribute prediction techniques can be employed in various embodiments to determine the attribute prediction. Typically, the attribute prediction of the current point is performed using previously reconstructed attributes of points neighboring the current point. When the attribute prediction process is started, based on the LOD-based order, reconstructed attribute values of points prior to the current point are already available. In addition, from the octree coding or decoding process, positions (3D coordinates) of the points in the point cloud are also available. Accordingly, the attribute prediction process can be performed with the knowledge of the reconstructed attributes and 3D coordinates of the neighboring points of the current point.

In some embodiments, a set of neighboring points of the current point can first be determined using various algorithms. In one example, a k-d tree structure based searching process can be performed to determine a set of points nearest to the current point.

In some embodiments, a geometric distance and/or attribute distance based approach is used to determine the attribute prediction. The prediction attribute can be determined based on a weighted sum (or weighted average) of reconstructed attributes of a set of determined neighboring points at the encoder or decoder. For example, with the set of determined neighboring points, the weighted sum (or weighted average) of the reconstructed attributes of the determined neighboring points can be determined to be the prediction attribute at the encoder or decoder. For example, a weight used in the weighted sum based technique (also referred to as an interpolation based technique) can be an inverse of (or inversely proportional to) a geometric distance, or an attribute distance. Alternatively, the weight can be a bilateral weight derived from a combination of a geometric distance based weight (a geometric eight) and an attribute distance based weight (an attribute weight).

In some embodiments, a rate-distortion (RD) based approach is used to determine the attribute prediction. For example, a candidate index may be associated with each reconstructed attribute value of the set of neighboring points at the encoder or decoder. At the encoder, an RD optimization based process can be performed to evaluate which one of the candidate reconstructed attribute values of the neighboring points is the best choice to be used as the attribute prediction. For example, a distortion can be measured by a difference between the original (or true) attribute value of the current point and a candidate prediction (candidate reconstructed attribute value). A rate can be a cost of encoding the index of the selected candidate prediction. A Lagrangian RD-cost function can be defined to determine the best prediction signal candidate. A candidate index of the selected candidate prediction can thus be signaled to the decoder.

Accordingly, the decoder may first determine a same set of neighboring points of a respective current point, and associate indices to the reconstructed attribute values of the same set of neighboring points in a similar way as the encoder side. Then, the decoder can determine an attribute prediction from the reconstructed attribute values of the neighboring points using the signaled candidate index.

6. Coding System Examples of Point Cloud Compression

Figure 3:
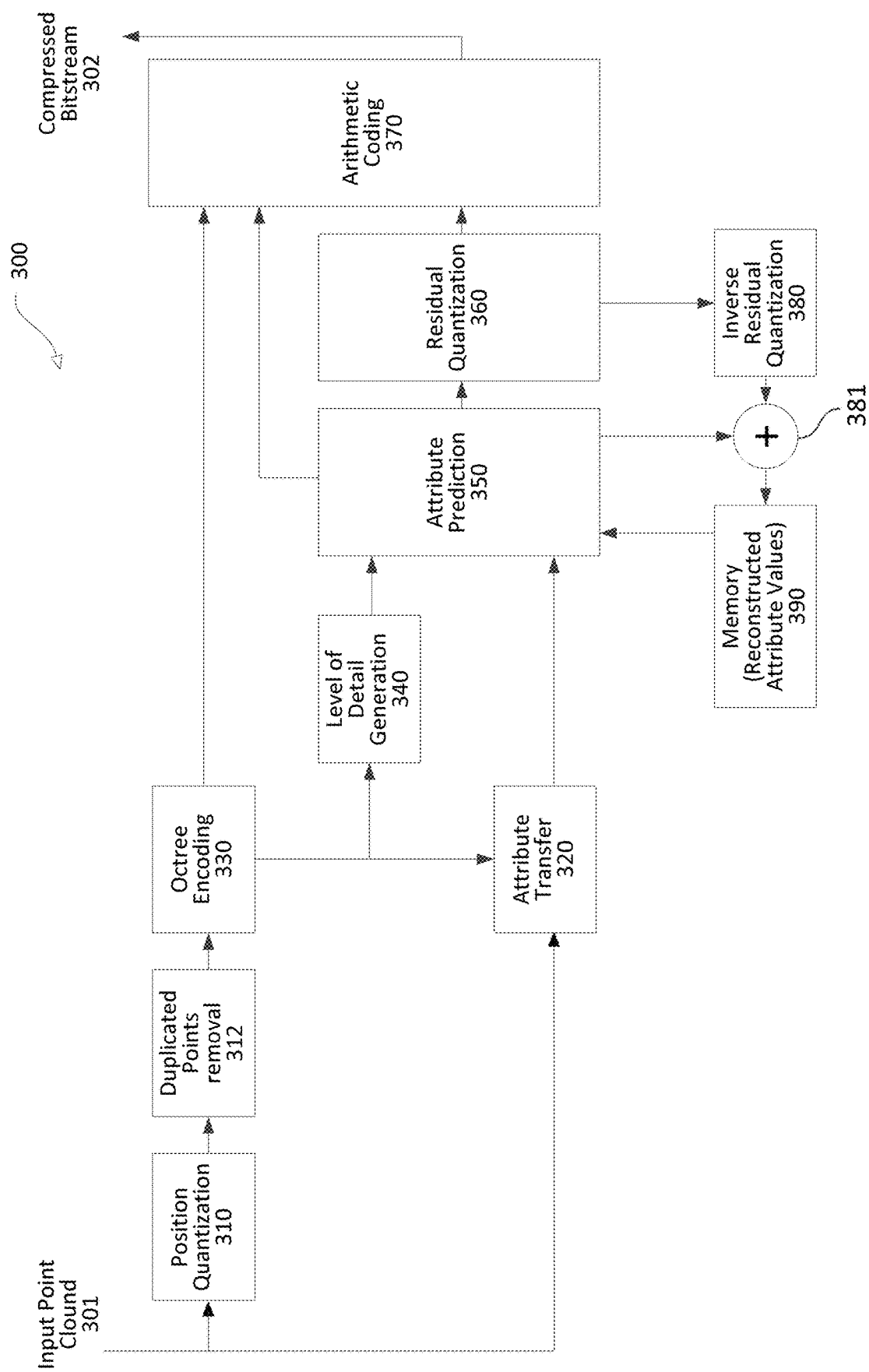
FIG. 3 shows an exemplary encoder in accordance with an embodiment.

FIG. 3 shows an exemplary encoder (300) in accordance with an embodiment. The encoder can be configured to receive point cloud data and compress the point cloud data to generate a bit stream carrying compressed point cloud data. In an embodiment, the encoder (300) can include a position quantization module (310), a duplicated points removal module (312), an octree encoding module (330), an attribute transfer module (320), an LOD generation module (340), an attribute prediction module (350), a residual quantization module (360), an arithmetic coding module (370), an inverse residual quantization module (380), an addition module (381), and a memory (390) to store reconstructed attribute values.

As shown, an input point cloud (301) can be received at the encoder (300). Positions (3D coordinates) of the point cloud (301) are provided to the quantization module (310). The quantization module (310) is configured to quantize the coordinates to generate quantized positions. The optional duplicated points removal module (312) is configured to receive the quantized positions and perform a filter process to identify and remove duplicated points. The octree encoding module (330) is configured to receive filtered positions from the duplicated points removal module, and perform an octree-based encoding process to generate a sequence of occupancy codes that describe a 3D grid of voxels. The occupancy codes are provided to the arithmetic coding module (370).

The attribute transfer module (320) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (330). The attributes after the transfer operations are provided to the attribute prediction module (350). The LOD generation module (340) is configured to operate on the re-ordered points output from the octree encoding module (330), and re-organize the points into different LODs. LOD information is supplied to the attribute prediction module (350).

The attribute prediction module (350) processes the points according to an LOD-based order indicated by the LOD information from the LOD generation module (340). The attribute prediction module (350) generates an attribute prediction for a current point based on reconstructed attributes of a set of neighboring points of the current point stored in the memory (390). Prediction residuals can subsequently be obtained based on original attribute values received from the attribute transfer module (320) and locally generated attribute predictions. When candidate indices are used in the respective attribute prediction process, an index corresponding to a selected prediction candidate may be provided to the arithmetic coding module (370).

The residual quantization module (360) is configured to receive the prediction residuals from the attribute prediction module (350), and perform quantization to generate quantized residuals. The quantized residuals are provided to the arithmetic coding module (370).

The inverse residual quantization module (380) is configured to receive the quantized residuals from the residual quantization module (360), and generate reconstructed prediction residuals by performing an inverse of the quantization operations performed at the residual quantization module (360). The addition module (381) is configured to receive the reconstructed prediction residuals from the inverse residual quantization module (380), and the respective attribute predictions from the attribute prediction module (350). By combining the reconstructed prediction residuals and the attribute predictions, the reconstructed attribute values are generated and stored to the memory (390).

The arithmetic coding module (370) is configured to receive the occupancy codes, the candidate indices (if used), the quantized residuals (if generated), and other information, and perform entropy encoding to further compress the received values or information. As a result, a compressed bitstream (302) carrying the compressed information can be generated. The bitstream (302) may be transmitted, or otherwise provided, to a decoder that decodes the compressed bitstream, or may be stored in a storage device.

Figure 4:
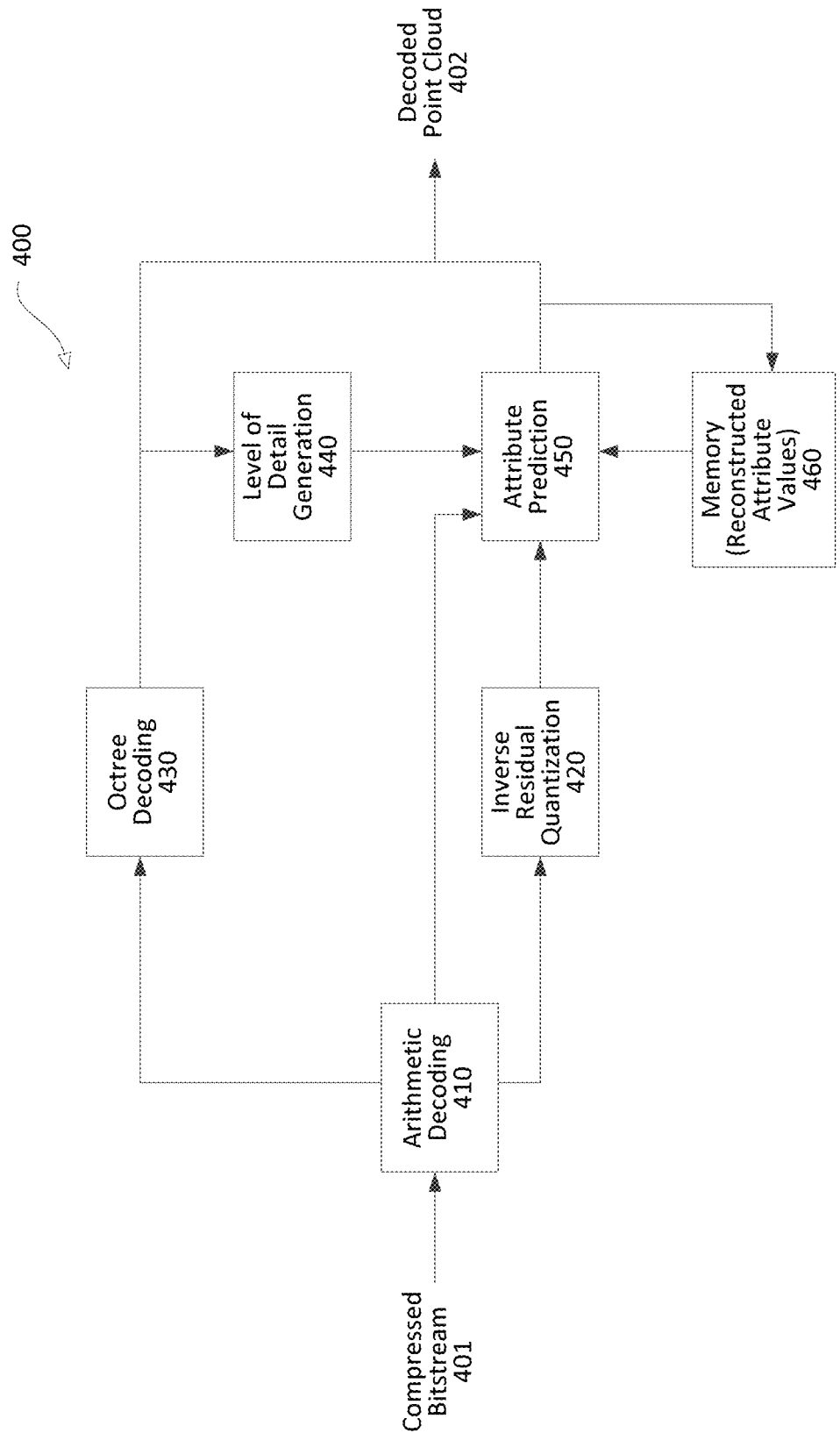
FIG. 4 shows an exemplary decoder in accordance with an embodiment.

FIG. 4 shows an exemplary decoder (400) in accordance with an embodiment. The decoder (400) can be configured to receive a compressed bitstream and perform point cloud data decompression to decompress the bitstream to generate decoded point cloud data. In an embodiment, the decoder (400) can include an arithmetic decoding module (410), an inverse residual quantization module (420), an octree decoding module (430), an LOD generation module (440), an attribute prediction module (450), and a memory (460) to store reconstructed attribute values.

As shown, a compressed bitstream (401) can be received at the arithmetic decoding module (410). The arithmetic decoding module (410) is configured to decode the compressed bitstream (401) to obtain quantized residuals (if generated) and occupancy codes of a point cloud. The octree decoding module (430) is configured to determine reconstructed positions of points in the point cloud according to the occupancy codes. The LOD generation module (440) is configured to re-organize the points into different LODs based on the reconstructed positions, and determine an LOD-based order. The inverse residual quantization module (420) is configured to generate reconstructed residuals based on the quantized residuals received from the arithmetic decoding module (410).

The attribute prediction module (450) is configured to perform an attribute prediction process to determine attribute predictions for the points according to the LOD-based order. For example, an attribute prediction of a current point can be determined based on reconstructed attribute values of neighboring points of the current point stored in the memory (460). The attribute prediction module (450) can combine the attribute prediction with a respective reconstructed residual to generate a reconstructed attribute for the current point.

A sequence of reconstructed attributes generated from the attribute prediction module (450) together with the reconstructed positions generated from the octree decoding module (430) corresponds to a decoded point cloud (402) that is output from the decoder (400) in one example. In addition, the reconstructed attributes are also stored into the memory (460) and can be subsequently used for deriving attribute predictions for subsequent points.

In various embodiments, the encoder (300) and decoder (400) can be implemented with hardware, software, or combination thereof. For example, the encoder (300) and decoder (400) can be implemented with processing circuitry such as one or more integrated circuits (ICs) that operate with or without software, such as an application specific integrated circuit (ASIC), field programmable gate array (FPGA), and the like. For another example, the encoder (300) and decoder (400) can be implemented as software or firmware including instructions stored in a non-volatile (or non-transitory) computer-readable storage medium. The instructions, when executed by processing circuitry, such as one or more processors, causing the processing circuitry to perform functions of the encoder (300) and decoder (400).

It is noted that the attribute prediction modules (350) or (450) configured to implement the attribute prediction techniques disclosed herein can be included in other decoders or encoders that may have similar or different structures from what is shown in FIG. 3 and FIG. 4. In addition, the encoder (300) and decoder (400) can be included in a same device, or separate devices in various examples.

II. Attribute Prediction Techniques

A geometric distance based interpolation technique can be used to determine an attribute prediction of a current point. For example, when performing an attribute prediction for the current point, 3D coordinates of points in a point cloud may already be available from an octree coding or decoding process. An LOD-based order of the points is also known from an LOD generation process. Reconstructed attribute values of the points prior to the current point according to the LOD-based order are also available.

With the knowledge of the 3D coordinates and the LOD-based order, a set of nearest neighboring points of the current point can be determined from the points processed prior to the current point. Then, a set of geometric weights of the neighboring points can be determined. A geometric weight of a neighboring point can be defined to be an inverse of (or inversely proportional to) a geometric distance between the neighboring point and the current point. Subsequently, the attribute prediction of the current point can be determined based on the set of geometric weights and the reconstructed attribute values. For example, a weighted average of the reconstructed attribute values of the neighboring points can be determined to be the attribute prediction of the current point. The weighted average can be a weighted sum of the reconstructed attribute values of the neighboring points divided by a sum of the set of geometric weights.

In the above geometric distance based interpolation technique, the weighting factor, which can be the inverse of the geometric distance between the current point and each of the neighboring points, can be used to form a weighted sum of neighboring attribute values as an attribute prediction. According to an aspect of the disclosure, in areas of the point cloud where the attribute values are smoothly varying or homogeneous, the above geometry based technique tends to be effective. However, in other cases, there can be very low correlation between the attribute distance and the geometric distance, thereby rendering the geometry-based weighted prediction of attribute less effective. Accordingly, other attribute prediction techniques are described in this disclosure that can be employed to form prediction signals for point-cloud attributes taking into account the characteristics of respective attribute signals. Compared with the geometry based techniques, more accurate attribute prediction with higher coding efficiency can be achieved when attribute characteristics are considered for the attribute prediction.

1. Attribute Distance and Bilateral Distance

As an alternative to or in combination with the geometric distance (GEOD), an attribute distance can be defined and used as a measure of proximity of neighboring points used in prediction for attribute coding.

In one embodiment, a median of reconstructed attribute values of neighboring points is adopted to derive the attribute-distance. Then, a deviation of the reconstructed attribute of each neighboring point from the median is defined as a median-attribute distance (MDAD). This median-attribute distance can be calculated at an encoder as well as a decoder since reconstructed attribute values used for calculating the median-attribute distance are available at both the encoder and the decoder.

In one embodiment, a mean of the reconstructed attribute values of neighboring points is adopted to derive the attribute-distance. Then, the deviation of the reconstructed attribute of each neighboring point from the mean is defined as the mean-attribute distance (MNAD). This mean-attribute distance can be calculated at the encoder or decoder since the mean-attribute distance is based on the reconstructed attribute values available at both the encoder and decoder.

In one embodiment, either the median-attribute or the mean-attribute distance can be used as a sole measure of proximity thereby giving a definition of an attribute-based weight ($W_a$) used for attribute prediction as follows:

$$W_a \sim \frac{1}{MDAD} \text{ or } W_a \sim \frac{1}{MNAD},$$

where "~" represents the respective weight is equal or proportional to the inverse of the respective attribute distance.

In another embodiment, either MDAD or MNAD as defined above can be used in combination with the geometric distance (GEOD) to form a bilateral distance as a measure of proximity thereby giving a definition of a bilateral weight (Wb) used for attribute prediction as follows:

$$W_b \sim \frac{1}{MDAD} W_g \text{ or } W_b \sim \frac{1}{MNAD} W_g$$

where $W_g$ represents a geometric weight and is defined as follows:

$$W_g \sim \frac{1}{GEOD}.$$

Further, in some embodiments, a combination of MDAD, MNAD, and GEOD can be used.

2. Winner-Take-All (WTA) Prediction with Various Distance Metrics

In some embodiments, a winner-takes-all (WTA) approach is employed to form an attribute prediction of a current point based on available reconstructed neighboring samples (e.g., reconstructed attribute values of neighboring points of the current point) based on geometric, attribute, and/or bilateral measures such $W_g$, $W_a$ and $W_b$. For example, a reconstructed neighboring attribute value with a highest weight among the reconstructed neighboring attribute values can be determined to be the attribute prediction of the current point. In mathematical form, the WTA approach can be represented as:

$$PRED_{WTA} = P_m,$$

where $PRED_{WTA}$ represents the attribute prediction, $$m = \underset{i}{\mathrm{argmax}}\, W_g(P_i),\ m = \underset{i}{\mathrm{argmax}}\, W_a(P_i)\ \text{or}\ m = \underset{i}{\mathrm{argmax}}\, W_b(P_i),$$

and Pi is the i-th reconstructed neighboring attribute value available for prediction.

In one embodiment, the WTA approach is always used when forming or choosing a prediction signal. In another embodiment, the encoder can signal for a sample or a group of samples including but not limited to macro-blocks, a frame/slice/tile, or the entire sequence whether the WTA approach is used or not. A sample can refer to one or more attribute values associated with a point in a point cloud.

In one embodiment, the WTA approach is used only when a condition specifying variability or the homogeneity of attribute values in the neighbor of the current point are satisfied. One example of the measure of variability is a maximum difference of neighboring attribute values. For example, when the variability of the reconstructed neighboring attribute values of the current point is greater or equal to a threshold, the WTA approach can be used.

In one embodiment, the WTA approach is taken only when the quantization parameter (QP) meets a certain threshold condition (e.g., smaller than a threshold, which may indicate a high variability of the reconstructed neighboring attribute values of the current point). Otherwise, other types of attribute prediction such as weighted prediction (e.g., geometric, attribute, or bilateral weight based prediction) can be used. In addition, coding conditions leading to similar effects of quantization can also be used separately or in combination with QP to determine which attribute prediction approach is to be used.

3. Weighted Average Prediction with Various Distance Metrics

In some embodiments, a weighted sum of reconstructed neighboring attribute values is used to form an attribute prediction based on measures such as $W_g$, $W_a$ and/or $W_b$. For example, a weighted-sum based attribute prediction can be derived according to:

$$PRED_{WTS} = \frac{\sum_{i=1}^{N} W_a(P_i)P_i}{\sum_{i=1}^{N} W_a(P_i)},\ \text{or}$$

$$PRED_{WTS} = \frac{\sum_{i=1}^{N} W_b(P_i)P_i}{\sum_{i=1}^{N} W_b(P_i)},$$

where $PRED_{WTS}$ represents a weighted-sum (or weighted-average) based attribute prediction, N is a number of reconstructed neighboring attribute values, and $P_i$ is the i-th reconstructed neighboring attribute value available for prediction.

In one embodiment, a weighted-sum (or weighted-average) based attribute prediction is calculated based on squares of the measures $W_g$, $W_a$ and/or $W_b$. For example, the attribute prediction can be calculated according to:

$$PRED_{WTS} = \frac{\sum_{i=1}^{N} (W_a(P_i))^2 P_i}{\sum_{i=1}^{N} (W_a(P_i))^2},\ \text{or}$$

$$PRED_{WTS} = \frac{\sum_{i=1}^{N} (W_b(P_i))^2 P_i}{\sum_{i=1}^{N} (W_b(P_i))^2}.$$

In an embodiment, the weighted average or weighted sum is used to form an attribute prediction only when the quantization parameter QP meets a certain threshold condition (e.g., larger than a threshold). Otherwise, other approaches such as WTA based prediction can be used in some embodiments. Coding conditions leading to similar effects of quantization can also be used separately or in combination with QP to determine which attribute prediction approach is to be used.

4. Median or Weighted Median Prediction with Various Distance Metrics

In some embodiments, a median or weighted median of reconstructed neighboring attribute values are used to form an attribute prediction of a current point. In an embodiment, a median of the reconstructed neighboring attribute values is used as the attribute prediction.

In an embodiment, a weighted median of the reconstructed neighboring attribute values is used as the attribute prediction based on weights determined by measures such as $W_a$ and/or $W_b$. For example, a cost-function $f(X_j)$ can be defined for each neighboring attribute-vector X as follows $$f(X_j) \triangleq W_j \sum_{i=1}^{N} \|X_j - X_i\|_p$$

where $X_i$ is a neighboring attribute-vector with i=1, . . . , N, j=1, . . . , N, N is the number of neighboring points corresponding to the reconstructed neighboring attribute values, and $\|\cdot\|_p$ is the $X_p$ norm, for which p=1 or p=2 can be chosen. A weight $W_j$ can represent the relative importance of the candidate vector $X_j$ and the smaller $W_j$ is, the more important $X_j$ is. The vector $X_j$ minimizing $f(X_j)$ above is defined as the weighted vector median $(X_{VM})$. For example, when each neighbor attribute-vector $X_j$ is one dimensional and represents a reconstructed neighboring attribute value, a weighted median attribute value can be calculated based on the cost-function $f(X_j)$. For example, an inverse of $W_a$ or $W_b$ can be used as the $W_j$.

In an embodiment, the median or a weighted median is used as an attribute prediction only when the quantization parameter QP meets a certain threshold condition (e.g., smaller or equal to a threshold). Otherwise, other approaches such as the weighted-sum prediction can be used. Coding conditions leading to similar effects of quantization can also be used separately or in combination with QP to determine which attribute prediction approach is to be used.

5. Pruning of Neighboring Attribute Values used for Prediction

In some embodiments, a set of nearest reconstructed neighboring attributes of a current point is first determined for example by performing a k-d tree structure based searching process. Subsequently, the set of determined neighboring attribute values can be pruned to remove inconsistent reconstructed neighboring attribute values. The pruning process can be applied to the attribute prediction techniques disclosed herein, such as the WTA approach, weighted-sum based approach, weighted median based prediction, RD optimization based prediction, and/or the like.

In an embodiment, a consistency check of the reconstructed neighboring attribute values is performed in order to remove one or more inconsistent attribute values. In one example, inconsistency detection finds one or more attribute values with a lowest weight in terms of $W_a$ or $W_b$ compared with other neighboring attribute values. The one or more attribute values with the lowest weight can be removed from the set of reconstructed neighboring attribute values.

In an embodiment, an approximate estimate of a local gradient of the reconstructed neighboring attribute values is considered to avoid prediction across an edge. For example, a local gradient can be estimated according to a sum of absolute attribute-value differences among the reconstructed neighboring attribute values. Alternatively, a local gradient can be estimated according to a sum of absolute attribute-value differences among a subset of the reconstructed neighboring attribute values that are along a certain direction of interest.

6. RD Optimization Based Selection from Multiple Prediction Techniques

In some embodiments, more than one type of attribute prediction method can be evaluated based on RD optimization performance at an encoder. Accordingly, an attribute prediction method with a highest RD optimization performance can be selected and signaled to a decoder. For example, the candidate prediction methods can include any techniques disclosed herein, such as the WTA approach, weighted-sum based approach, weighted median based prediction, RD optimization based prediction, and/or the like.

In one embodiment, a flag indicating the selected prediction method is signaled from the encoder to the decoder for prediction coding of one or a group of samples (e.g., attribute values). Based on the received flag, the decoder can determine the selected prediction method for prediction of the respective one or group of samples.

In one example, corresponding to a selected prediction method, an index indicating a predetermined subset of reconstructed attribute values can be signaled for the respective one or group of samples. Based on the received index, the decoder can determine the subset of reconstructed attribute values for prediction of the respective one or group of samples.

7. RD optimization Based Attribute Prediction

In some embodiments, an encoder or decoder can determine a group of neighboring points of a current point for attribute prediction, and associate an index with a reconstructed attribute value of each member of the group of neighboring points. The reconstructed attribute values of the group of neighboring points are used as candidates for selecting a reconstructed attribute value to be an attribute prediction of the current point. The encoder and decoder can determine the group of neighboring points and associate indices with the candidate reconstructed attribute values in an identical, or similar, way.

After the group of neighboring points is determined, at the encoder side, an RD optimization based evaluation can be performed to select a candidate attribute value from the group of neighboring samples (the reconstructed attribute values of the group of neighboring points) to be the prediction of the current point. An index corresponding to the selected neighboring sample can be signaled to the decoder side. At the decoder side, based on the received index, the same candidate determined at the encoder side, can be determined from the group of neighboring samples. The candidate can be used as the prediction of the current point at the decoder side.

(a) Forming the Group of Neighboring Points

In one embodiment, the group of neighboring points that provide candidate samples for attribute prediction of the current point is a group of nearest neighboring points of the current point in terms of geometric distances. For example, the group of nearest neighboring points can be determined by performing a k-d tree structure based search process over points of which reconstructed attribute values are already available.

In one embodiment, the group of neighboring points that provide candidate samples can be determined with a two-step process. For example, a set of nearest neighboring points of the current point in terms of geometric distance can be determined in a first step. Thereafter, a subset of the set of nearest neighboring points can be selected to be the group of neighboring points. For example, the selection can be based on an attribute distance (e.g., median-attribute distance, or mean-attribute distance) of each member of the set of nearest neighboring points. Members with the shortest attribute distance can be determined to be the group of neighboring points. In another example, the selection can be based on an attribute distance based weight or bilateral weight (e.g., $W_a$, or $W_g$) of each member of the set of nearest neighboring points. Members with the highest weights can be determined to be in the group of neighboring points. In other examples, methods different from the above may be used to determine the group of neighboring points.

(b) Index Coding Examples

Figures 5, 6:
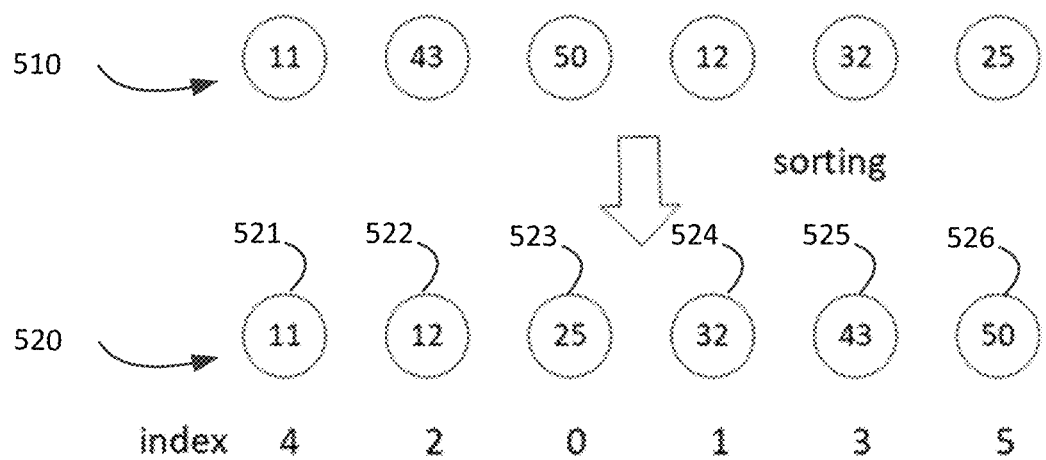
FIG. 5 shows an example of associating indices with a group of candidate neighboring samples of a current point in accordance with an embodiment.
FIG. 6 shows an example of encoding indices using truncated unary code.

FIG. 5 shows an example of assigning indices to a group (510) of candidate neighboring samples of a current point in accordance with an embodiment. As shown, the group (510) of candidate neighboring samples includes a set of samples having reconstructed attribute values 11, 43, 50, 12, 32, and 25. A sorting process is performed at the encoder side or decoder side to obtain a group (520) of sorted samples (521)-(526). In one example, the sorting is based on the values of each sample in the group (510). Subsequently, a set of indices are assigned to members of the group (520) with a median-first order.

For example, when the group (520) of sorted neighboring samples has an odd number of members, the member with the median value is assigned an index of 0. Then, the other members in the group (520) are assigned indices in a way that the members closer to the median value are assigned smaller indices. For a pair of members having an equal distance to the median value and located at either side of the median value, either the right-side one or the left-side one can be assigned an index first (e.g., assign a smaller index) in different embodiments.

In another example, when the group (520) of sorted neighboring samples has an even number of members, an average of the values of the two middlemost samples can be used as the median value. Then, in a similar way, the members in the group (520) are assigned indices in a way that the members closer to the median value are assigned smaller indices. For a pair of members having an equal distance to the median value and located at either side of the median value, either the right-side one or the left-side one can be assigned an index first (e.g., assign a smaller index) in different embodiments. In FIG. 5, the samples (523) and (524) are the two middle most samples. The sample (523) to the left of the respective median value can be assigned the index of 0 in one example. However, the sample (524) can be assigned the index of 0 in another example.

In an embodiment, the assigned indices in the FIG. 5 example are encoded using truncated unary code as shown in FIG. 6. The bits of the truncated unary codes can be further coded using arithmetic coding, for example, with multiple context models. In various examples, indices assigned to a group of sorted candidate neighboring samples may be coded with other types of codes other than the truncated unary code.

Figure 7:
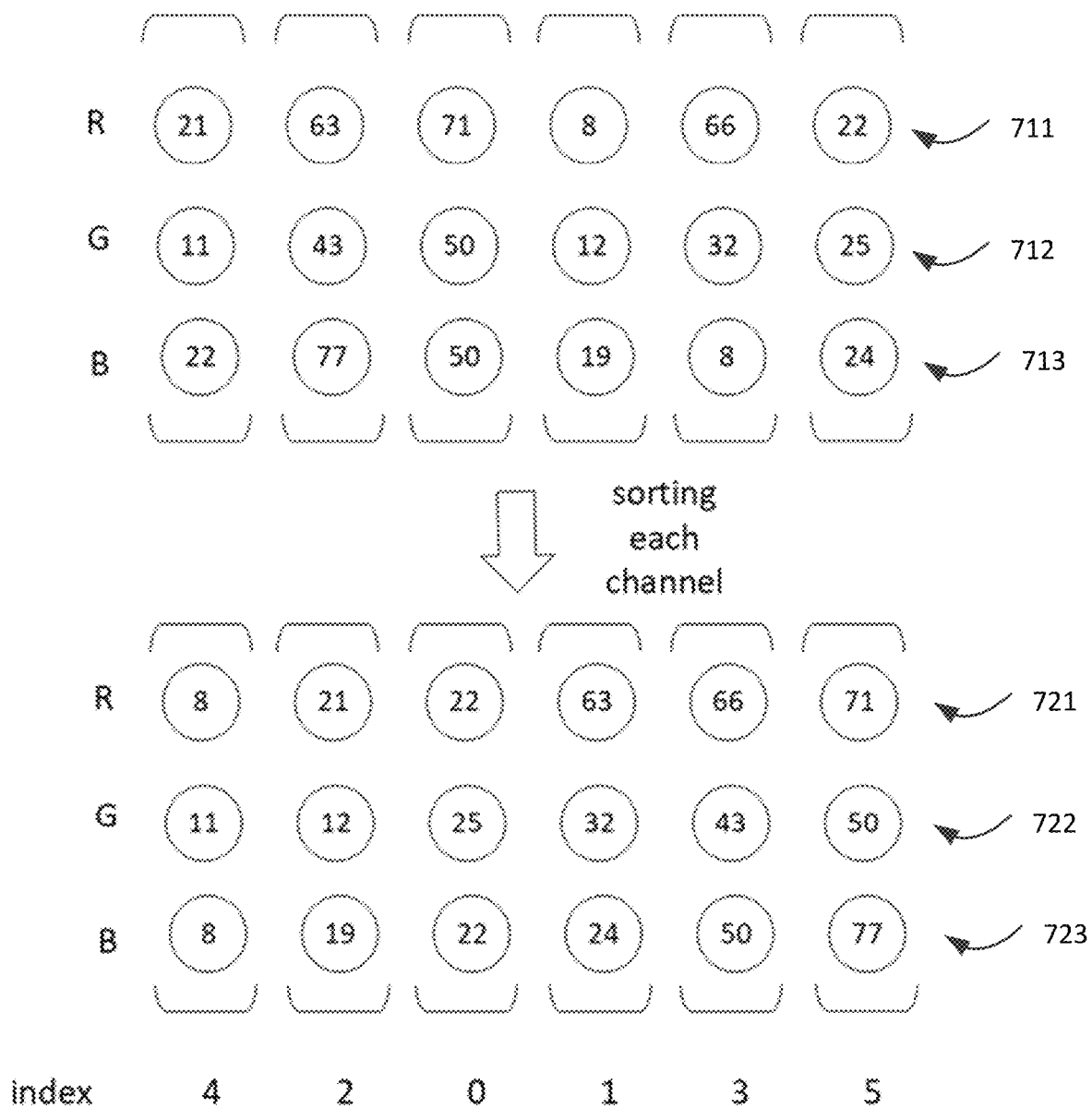
FIG. 7 shows an example of associating indices with multiple groups of candidate neighboring samples in accordance with an embodiment.

FIG. 7 shows an example of associating indices with multiple groups (711)-(713) of candidate neighboring samples in accordance with an embodiment. For example, points of a point cloud are each associated with multiple attributes, such as attribute values of RGB color channels. In this case, a group of candidate neighboring points of a current point can be associated with the groups (711)-(713) of neighboring reconstructed samples. Each of the groups (711)-(713) corresponds to one of the RGB color channels. An encoder or decoder can first perform a sorting process to sort attribute values of each of the groups (711)-(713) according to sample values in each respective group. As a result, three groups (721)-(723) of sorted samples can be obtained as shown in FIG. 7.

Subsequently, in a way similar to the method used in the FIG. 5 example, the three groups of sorted samples can be assigned indices, for example with a median-first order. As shown, the samples in each group (721)-(723) are assigned from the left to the right with indices 4, 2, 0, 1, 3, and 5.

During operations of determining an attribute prediction for each color channel of the current point based on an RD optimization based evaluation process, the RGB color channels can be processed independently in one embodiment. As a result, three indices corresponding to the three groups (721)-(723) can be determined, and signaled to the decoder side. For example, the resultant indices can be coded with truncated unary codes or other suitable codes, and further compressed using arithmetic coding possibly with context models.

Figure 8:
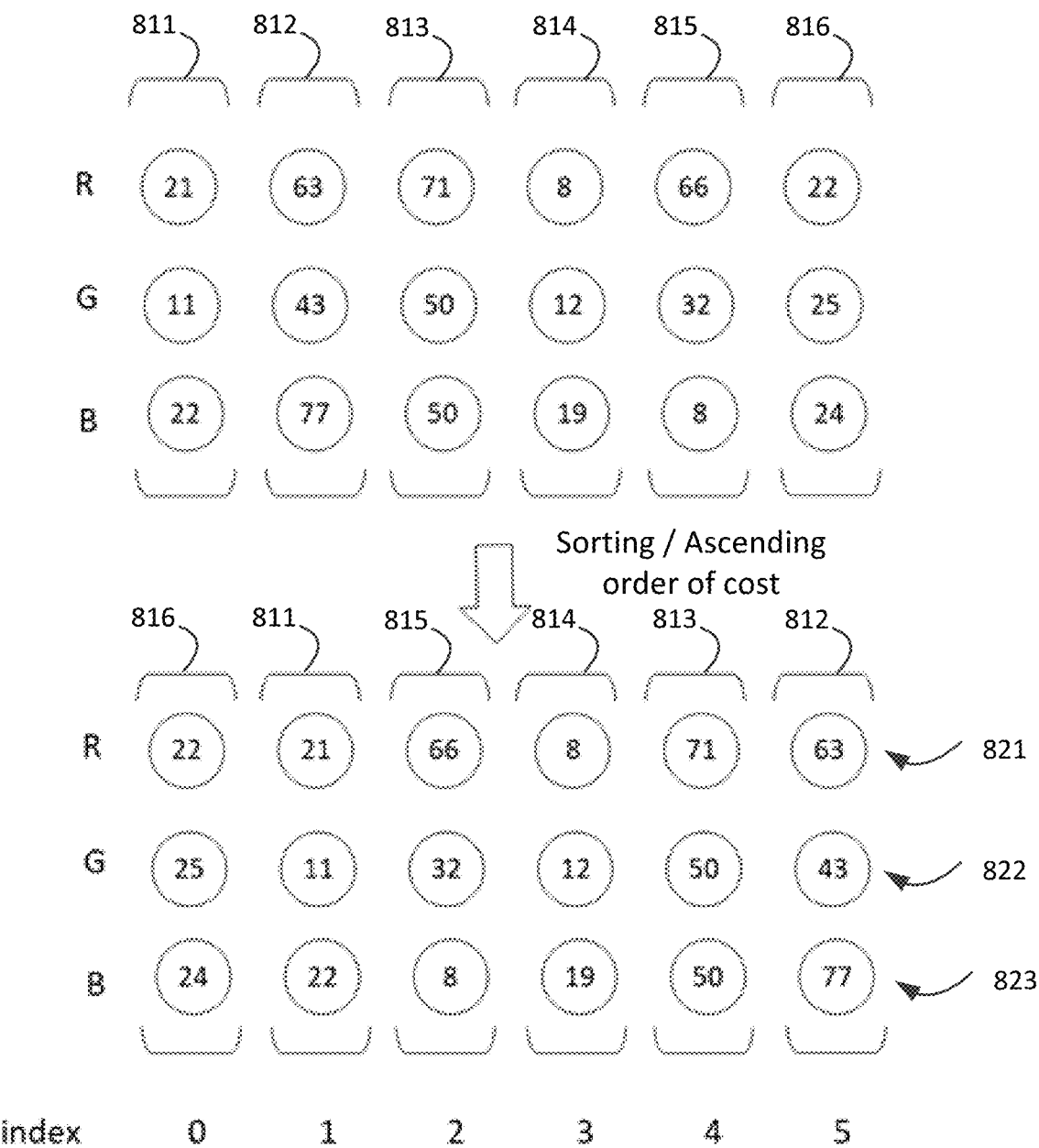
FIG. 8 shows an example of assigning indices based on costs of attribute vectors in accordance with an embodiment.

FIG. 8 shows an example of assigning indices based on costs of attribute vectors in accordance with an embodiment. For example, points of a cloud can each be associated with an attribute vector. Each attribute vector can include a set of attribute values, such as attribute values of RGB color channels. In this scenario, a group of neighboring points of a current point can be associated with a group of neighboring attribute vectors (811)-(816) including candidate reconstructed attribute values available for attribute prediction for the current point.

An encoder or decoder can first determine a cost for each attribute vector (811)-(816) based on a cost function. In one example, the cost function is defined as follows:

$$f(X_j) = \sum_{i=1}^{N} \|X_j - X_i\|_1,$$

where $f(X_j)$ represents a cost corresponding to a neighboring attribute vector represented by $X_j$, $X_i$ is a neighboring attribute vector with i=1, . . . , N, and $\|\cdot\|_1$ is an $L_1$ norm. A vector $X_j$ minimizing the cost function is defined as a vector median ($X_{VM}$). In other examples, depending on statistics of the attribute vectors, other cost functions can be used. For example, a different vector norm may be used for determining the costs instead of the $L_1$ norm.

Next, the encoder or decoder may sort the neighboring attribute vectors, for example, in an ascending order, based on the costs of the neighboring attribute vectors. Then, indices are assigned to each attribute vectors in an order consistent with the sorting order. For example, ascending indices starting from 0 are assigned corresponding to the ascending order of the neighboring attribute vectors. In FIG. 8, the attribute vectors (811)-(816) have the costs of 360, 510, 456, 414, 384, and 328, respectively. Accordingly, after the sorting operation, the attribute vectors (811)-(816) are rearranged in an order of (816), (811), (815), (814), (813), and (812), as shown in FIG. 8. Then, indices from 0 to 5 are assigned to the sorted attribute vectors from the lowest cost to the highest cost.

Finally, different from FIG. 7, the designated index of the chosen candidate vector which minimizes the RD-cost is encoded with truncated unary codes or other suitable codes, and further compressed using arithmetic coding possibly with context models.

(c) Extra Conditions for Index Coding

A sampling grid of point cloud data typically is not uniform. When coding attribute values of a point cloud, the number of neighboring reconstructed samples selected for attribute prediction of a current point can vary depending on the location of such a current point in the point cloud. Accordingly, in one embodiment, instead of coding an index regardless of a parity of the number of neighboring samples of a current point as described above, the median sample value itself can be used for one chosen parity case. As a result, side-information cost of coding indices of candidate neighboring samples can be saved.

For example, the index coding (or assigning) as described above is performed for a scenario where the number of neighboring samples is even, while a median value is used for a scenario where the number of neighboring samples is odd. Alternatively and conversely, the index coding is performed for the odd number of neighboring sample scenarios while the median value is used for the even number of neighboring sample scenarios. In this way, no index is signaled when a median value is used as the attribute prediction, thus saving coding bits.

In another embodiment, an RD optimization based attribute prediction (with index coding or assigning) is invoked when a group of neighboring samples available for attribute prediction of a current point are not homogeneous according to a certain criteria. Or, in other words, the RD optimization based attribute prediction can be invoked when a variability of a group of neighboring samples available for attribute prediction of a current point is above or equal to a threshold. For example, when a maximum attribute value difference among the neighboring samples is above or equal to a certain threshold, it can be considered inhomogeneous. As another example, a local gradient of reconstructed neighboring attribute values can be used to detect an edge which renders the respective neighboring region inhomogeneous. In contrast, when the group of neighboring samples is homogeneous, a WTA type scheme or a weighted-sum or weighted-average of neighboring samples can be adopted for attribute prediction of the current point.

Figure 9:
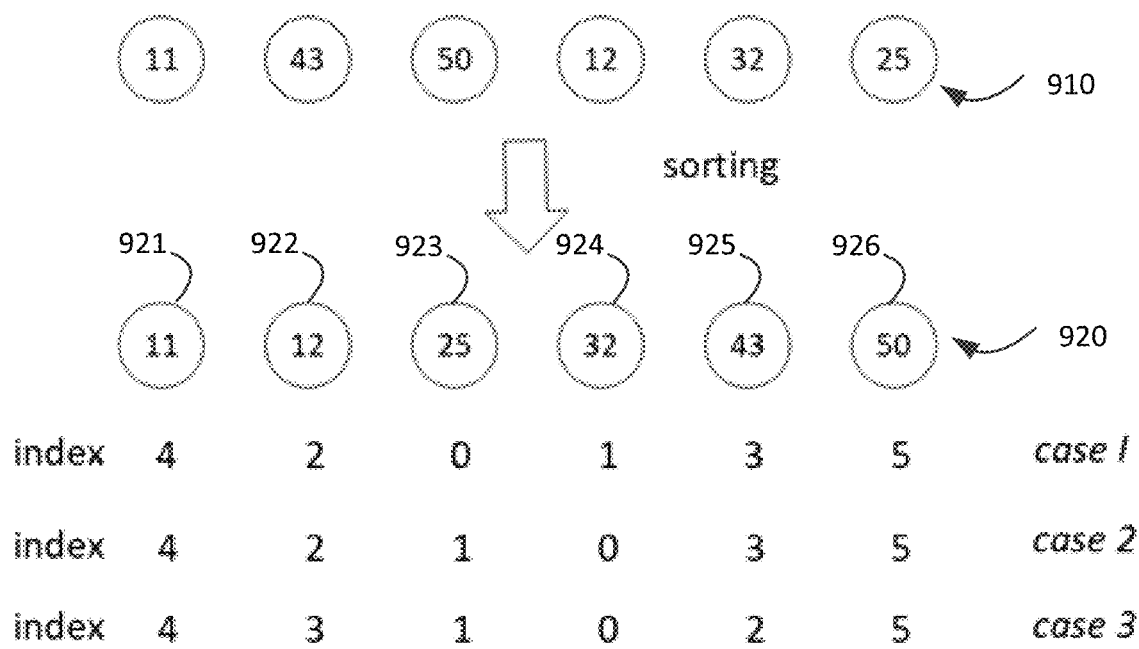
FIG. 9 shows an example of indexing sorted samples by additionally considering a geometric distance of a candidate predictor sample from a current sample in accordance with an embodiment.

In another embodiment, the indexing of sorted samples described above can be performed by additionally considering a geometric distance of a candidate predictor sample from a current sample (sample of a current point). As shown in FIG. 9, a group (910) of neighboring reconstructed samples of a current sample is sorted based on sample values resulting in a group (920) of sorted samples (921)-(926). In case 1, a set of indices are assigned to the sorted samples (921)-(926) according to a median-first order. By considering geometric distances of the candidate samples (921)-(926), the index can be assigned as shown in case 2 as opposed to case 1. Specifically, the indices of the samples (923) and (924) are switched if the sample (924) is geometrically closer to the current sample than the sample (923). Similarly, in case 3, when the sample (925) is geometrically closer to the current sample than the sample (922), the index can be assigned in a way different from case 2. Specifically, the sample (925) is adjusted to have a smaller index value than the sample (922).

III. Attribute Prediction Process Examples

Figure 10:
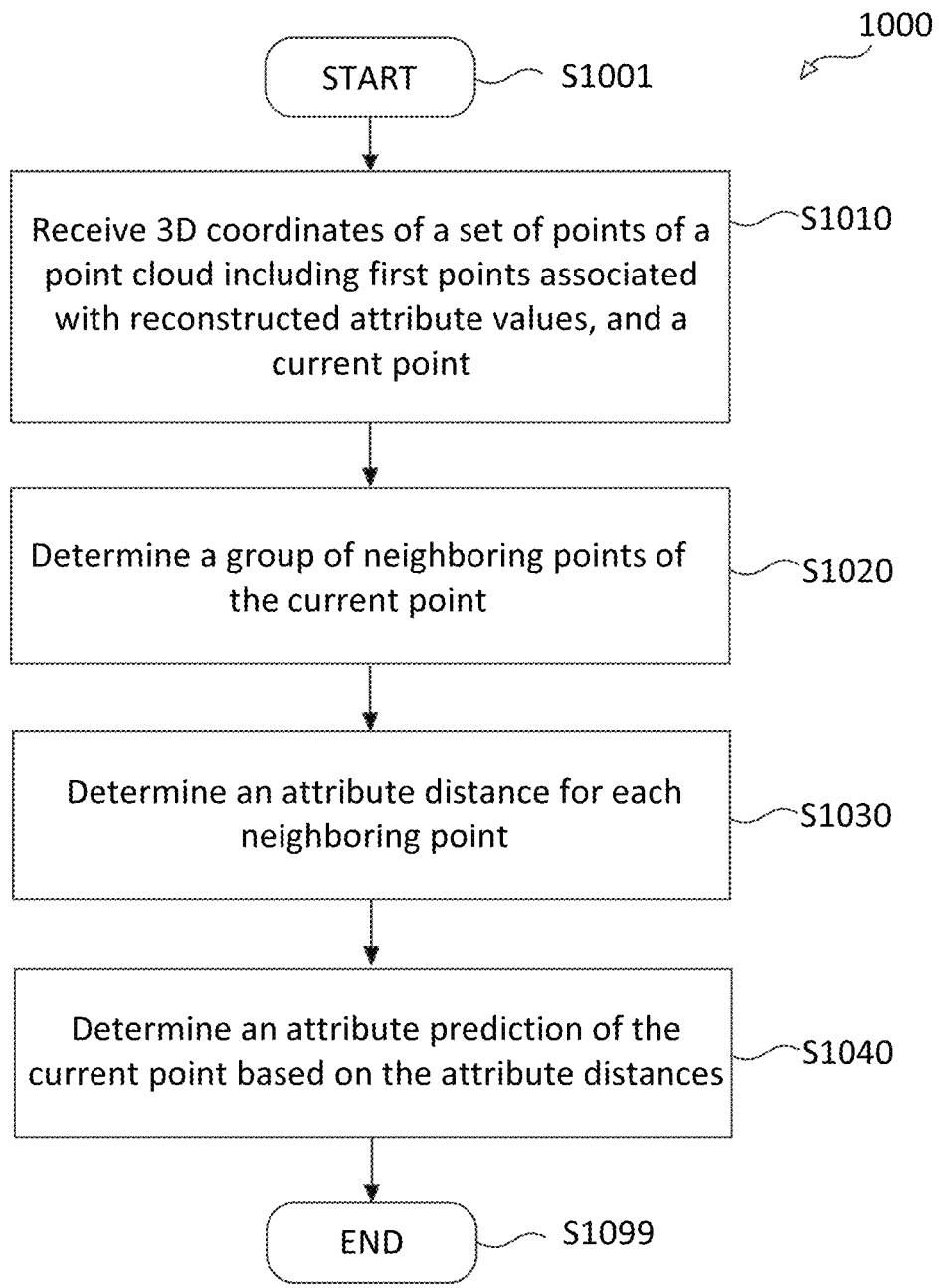
FIG. 10 shows an attribute prediction process according to an embodiment of the disclosure.

FIG. 10 shows a flow chart outlining a process (1000) according to an embodiment of the disclosure. The process (1000) can be used to generate an attribute prediction of a current point of a point cloud at an encoder side or a decoder side. In various embodiments, the process (1000) can be executed by processing circuitry, such as the processing circuitry performing functions of the attribute prediction module (350) in the encoder (300), or the processing circuitry performing functions of the attribute prediction module (450) in the encoder (400). In some embodiments, the process (1000) is implemented in software instructions, thus when the processing circuitry executes the software instructions, the processing circuitry performs the process (1000). The process starts at (S1001) and proceeds to (S1010).

At (S1010), 3D coordinates of a set of points of a point cloud can be received. For example, the 3D coordinates can be obtained from an octree coding or decoding process. However, other coding or decoding processes can be utilized in other embodiments. In addition, the set of points can include first points of which attribute values have been reconstructed and available for attribute prediction of a current point included in the set of points.

At (S1020), a group of neighboring points of the current point can be determined from the first points, as described above. For example, the group of neighboring points can be a set of nearest neighboring points in terms of geometric distances to the current point.

At (S1030), an attribute distance can be determined for each of the group of the neighboring points based on the reconstructed attribute values of the group of the neighboring points. For example, the attribute distance can be a median-attribute distance, a mean-attribute distance, or the like.

At (S1040), an attribute prediction of the current point can be determined based on the attribute distances of the group of neighboring points. For example, attribute distance based weights or bilateral weights can be derived based on the respective attribute distances. A weighted-sum or weighted-average scheme, or a WTA scheme may be adopted to determine the attribute prediction of the current point based on the respective weights. At the encoder side, the obtained attribute prediction can be used to generate a prediction residual of the current point by subtracting the attribute prediction from an original attribute value of the current point. At the decoder side, the obtained attribute prediction can be used to generate a reconstructed attribute value of the current point by adding the attribute prediction to a prediction residual of the current point generated from an entropy decoding process. The process (1000) proceeds to (S1099), and terminates at (S1099).

Figure 11:
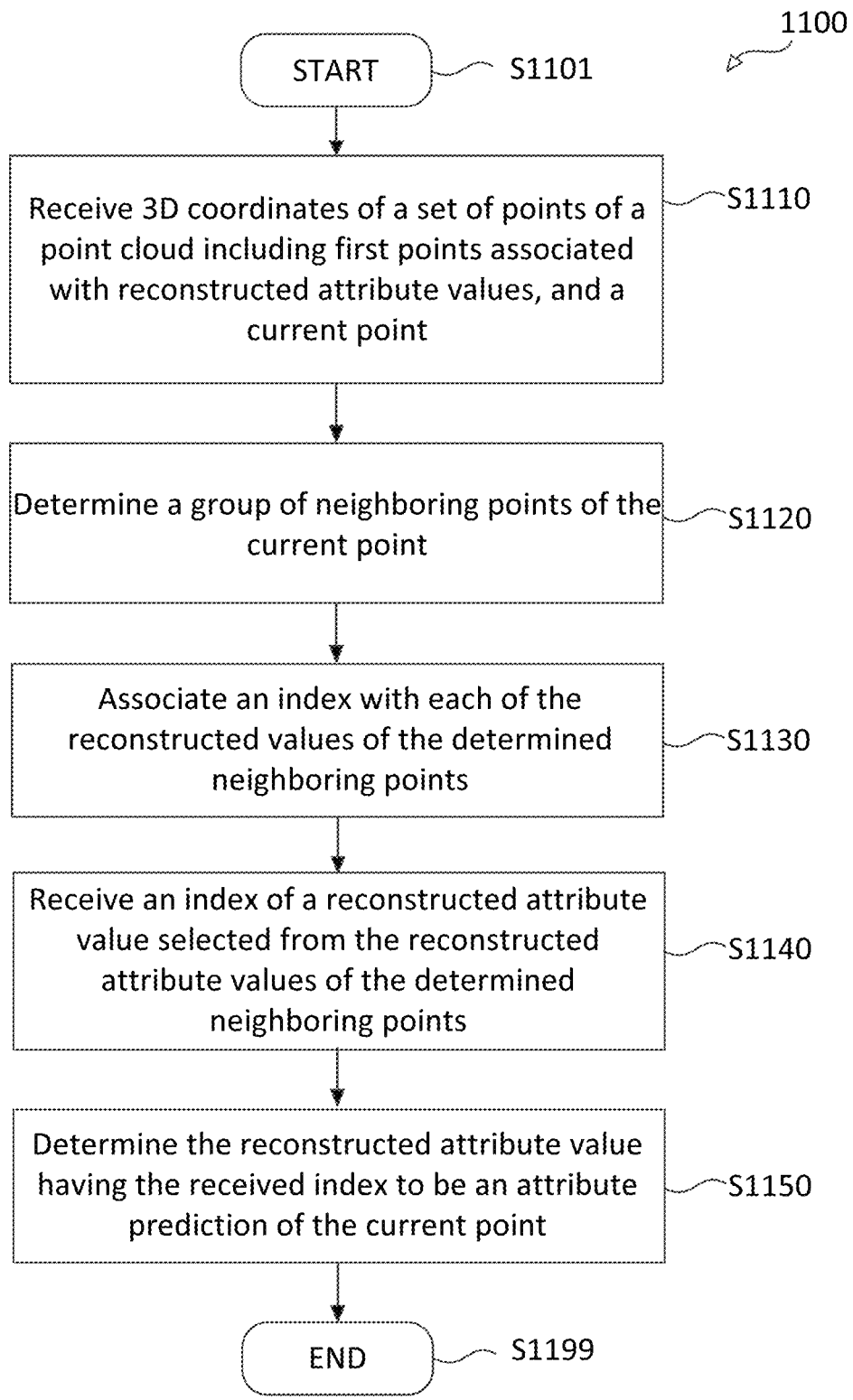
FIG. 11 shows another attribute prediction process according to an embodiment of the disclosure.

FIG. 11 shows a flow chart outlining a process (1100) according to an embodiment of the disclosure. The process (1100) can be used to generate an attribute prediction of a current point of a point cloud at a decoder side. In various embodiments, the process (1100) can be executed by processing circuitry, such as the processing circuitry performing functions of the attribute prediction module (450) in the encoder (400). In some embodiments, the process (1100) is implemented in software instructions, thus when the processing circuitry executes the software instructions, the processing circuitry performs the process (1100). The process starts at (S1101) and proceeds to (S1110).

At (S1110), 3D coordinates of a set of points of a point cloud can be received. For example, the 3D coordinates can be obtained from an octree decoding process, or another decoding process. In addition, the set of points can include first points of which attribute values have been reconstructed and available for attribute prediction of a current point included in the set of points.

At (S1120), a group of neighboring points of the current point can be determined from the first points. For example, the group of neighboring points can be a group of nearest neighboring points in terms of geometric distances to the current point. Alternatively and optionally, an addition process is performed to select a subset of the group of nearest neighboring points to be the group of neighboring points. For example, the selection can be based on attribute distances, attribute based weights, and/or bilateral weights associated with each of the group of nearest neighboring.

At (S1130), an index is associated with each of the reconstructed attribute values of the group of neighboring points of the current point. For example, the index coding methods described herein can be employed. For example, reconstructed attribute values (or samples) or attribute vectors may be sorted before assigning the indices with the reconstructed attribute values.

At (S1140), an index can be received that indicates a reconstructed attribute value selected from the reconstructed attribute values of the determined neighboring points, for example, from an encoder side.

At (S1150), the reconstructed attribute value indicated by the received index can be used as an attribute prediction of the current point. The attribute prediction can subsequently be used to generate a reconstructed attribute value of the current point, for example, by combining the attribute prediction with a respective prediction residual generated from an entropy decoding process. The process (1100) proceeds to (S1199), and terminates at (S1199).

IV. Computer System

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
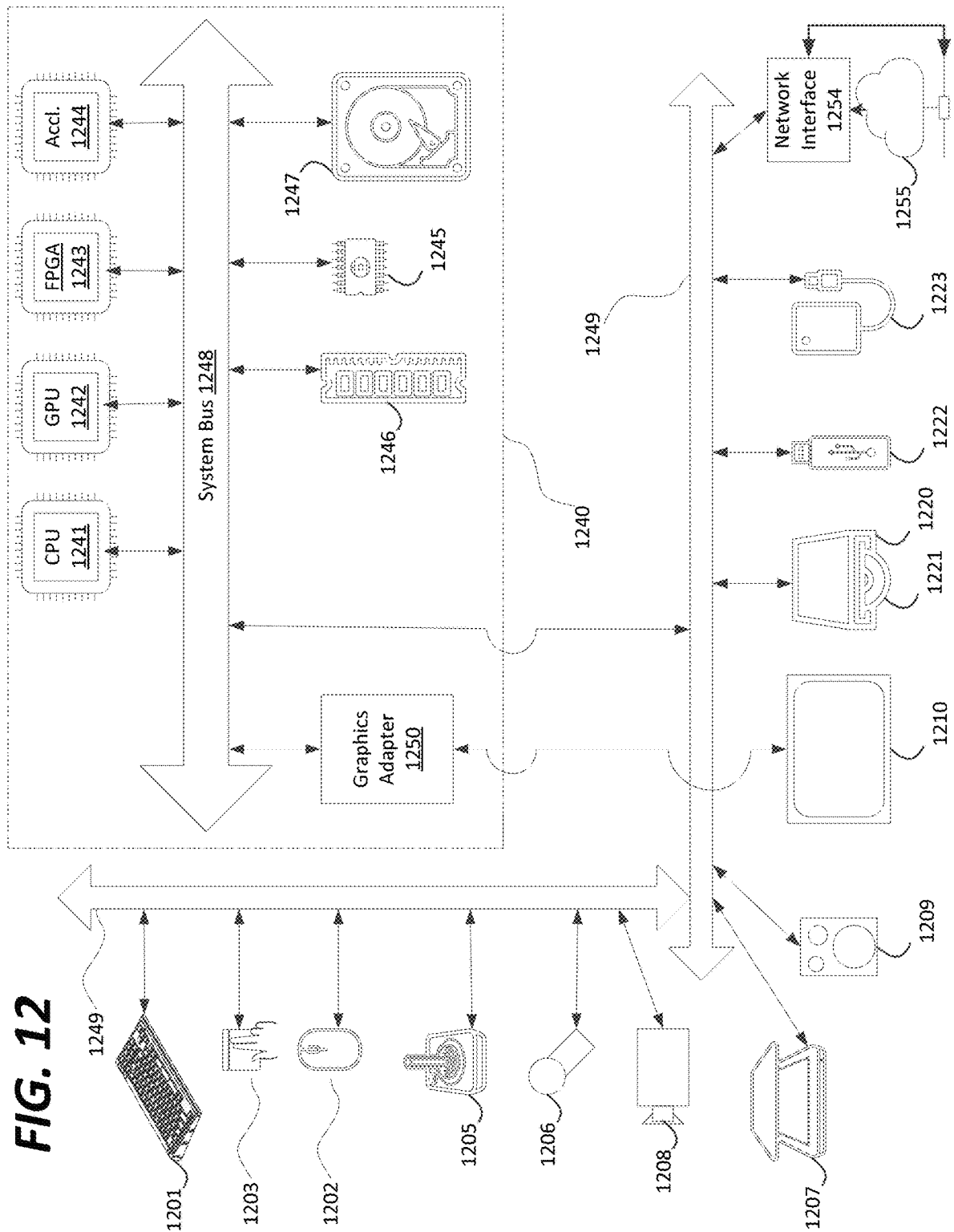
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of processing point cloud data at a decoder, comprising:
    receiving three dimensional (3D) coordinates of a set of points of a point cloud including first points and a current point, each of the first points being associated with a reconstructed attribute value;
    determining a group of neighboring points of the current point from the first points;
    determining an attribute distance for each of the neighboring points based on the reconstructed attribute values of the neighboring points, the attribute distance of the respective neighboring point being a deviation of the reconstructed attribute value of the respective neighboring point from a median or mean value of the reconstructed attribute values of the neighboring points;
    determining a weight for the reconstructed attribute value of each of the neighboring points based on the attribute distance of the respective neighboring point, the weight for the reconstructed attribute value of the respective neighboring point being inversely proportional to the attribute distance of the respective neighboring point;
    determining an attribute prediction of the current point based on the weights of the reconstructed attribute values of the neighboring points; and
    combining the attribute prediction of the current point with a residual signal of the current point to obtain a reconstructed attribute value of the current point.

2. The method of claim 1, wherein the group of determined neighboring points of the current point are a subset of the first points that are nearest to the current point in terms of geometric distances.

3. The method of claim 1, wherein the attribute prediction of the current point is one of:
    one of the reconstructed attribute values of the neighboring points with a highest weight among the weights of the reconstructed attribute values of the neighboring points,
    a weighted sum of the reconstructed attribute values of the neighboring points based on the weights of the reconstructed attribute values of the neighboring points, and
    a weighted median of the reconstructed attribute values of the neighboring points based on the weights of the reconstructed attribute values of the neighboring points.

4. The method of claim 1, wherein the determining the weight for the reconstructed attribute value of the respective neighboring point includes:
    determining the weight for the reconstructed attribute value of the respective neighboring point based on a geometric distance of the respective neighboring point, the weight for the reconstructed attribute value of the respective neighboring point being inversely proportional to the attribute distance and the geographic distance of the respective neighboring point.

5. The method of claim 1, wherein the determining the attribute prediction of the current point further comprises:
    determining one of the reconstructed attribute values of the neighboring points with a highest weight to be the prediction of the current point.

6. The method of claim 5, wherein the determining the attribute prediction of the current point further comprises:
    when a measure of variability of the reconstructed attribute values of the neighboring points is above a threshold, determining the one of the reconstructed attribute values of the neighboring points with the highest weight to be the prediction of the current point.

7. The method of claim 1, wherein the determining the attribute prediction of the current point further comprises:
    determining a weighted sum of the reconstructed attribute values of the neighboring points to form the prediction of the current point based on the weights of the reconstructed attribute values of the neighboring points.

8. The method of claim 1, wherein the determining the attribute prediction of the current point further comprises:
    determining a weighted median of the reconstructed attribute values of the neighboring points to be the prediction of the current point based on the weights of the reconstructed attribute values of the neighboring points.

9. The method of claim 1, further comprising:
    performing a pruning process to remove the point having an inconsistent reconstructed attribute value from the neighboring points of the current point, the point having the inconsistent reconstructed attribute value having a lowest attribute based or bilateral weight among the weights of the reconstructed attribute values of the neighboring points of the current point, wherein the determining the attribute distance includes determining the attribute distance for each of the remaining neighboring points after the pruning process is performed.

10. The method of claim 1, further comprising:

performing a pruning process to remove the point having an inconsistent reconstructed attribute value from the neighboring points of the current point, the point having the inconsistent reconstructed attribute value having an attribute based weight and a geometric distance based weight that have a difference above a threshold, wherein the determining the attribute distance includes determining the attribute distance for each of the remaining neighboring points after the pruning process is performed.

11. The method of claim 1, further comprising:

receiving a flag syntax element indicating a prediction method selected from multiple prediction methods; and determining the attribute prediction of the current point based on the attribute distances of the neighboring points with the indicated prediction method.

12. An apparatus of processing point cloud data, comprising circuitry configured to:

receive three dimensional (3D) coordinates of a set of points of a point cloud including first points and a current point, each of the first points being associated with a reconstructed attribute value;

determine a group of neighboring points of the current point from the first points;

determine an attribute distance for each of the neighboring points based on the reconstructed attribute values of the neighboring points, the attribute distance of the respective neighboring point being a deviation of the reconstructed attribute value of the respective neighboring point from a median or mean value of the reconstructed attribute values of the neighboring points;

determine a weight for the reconstructed attribute value of each of the neighboring points based on the attribute distance of the respective neighboring point, the weight for the reconstructed attribute value of the respective neighboring point being inversely proportional to the attribute distance of the respective neighboring point;

determine an attribute prediction of the current point based on the weights of the reconstructed attribute values of the neighboring points; and combine the attribute prediction of the current point with a residual signal of the current point to obtain a reconstructed attribute value of the current point.

13. The apparatus of claim 12, wherein the group of determined neighboring points of the current point are a subset of the first points that are nearest to the current point in terms of geometric distances.

14. The apparatus of claim 12, wherein the attribute prediction of the current point is one of:

one of the reconstructed attribute values of the neighboring points with a highest weight among the weights of the reconstructed attribute values of the neighboring points, a weighted sum of the reconstructed attribute values of the neighboring points based on the weights of the reconstructed attribute values of the neighboring points, and a weighted median of the reconstructed attribute values of the neighboring points based on the weights of the reconstructed attribute values of the neighboring points.

15. The apparatus of claim 12, wherein the circuitry is further configured to:

determine the weight for the reconstructed attribute value of the respective neighboring point based on a geometric distance of the respective neighboring point, the weight for the reconstructed attribute value of the respective neighboring point being inversely proportional to the attribute distance and the geographic distance of the respective neighboring point.

16. The apparatus of claim 12, wherein the circuitry is further configured to:

determine one of the reconstructed attribute values of the neighboring points with a highest weight to be the prediction of the current point.

17. The apparatus of claim 16, wherein the circuitry is further configured to:

when a measure of variability of the reconstructed attribute values of the neighboring points is above a threshold, determine the one of the reconstructed attribute values of the neighboring points with the highest weight to be the prediction of the current point.

18. The apparatus of claim 12, wherein the circuitry is further configured to:

determine a weighted sum of the reconstructed attribute values of the neighboring points to form the prediction of the current point based on the weights of the reconstructed attribute values of the neighboring points.

19. The apparatus of claim 12, wherein the circuitry is further configured to:

determine a weighted median of the reconstructed attribute values of the neighboring points to be the prediction of the current point based on the weights of the reconstructed attribute values of the neighboring points.

20. A non-transitory computer-readable medium storing instructions that, when executed by a processor, cause the processor to perform a method of processing point cloud data, the method comprising:

receiving three dimensional (3D) coordinates of a set of points of a point cloud including first points and a current point, each of the first points being associated with a reconstructed attribute value;

determining a group of neighboring points of the current point from the first points;

determining an attribute distance for each of the neighboring points based on the reconstructed attribute values of the neighboring points, the attribute distance of the respective neighboring point being a deviation of the reconstructed attribute value of the respective neighboring point from a median or mean value of the reconstructed attribute values of the neighboring points;

determining a weight for the reconstructed attribute value of each of the neighboring points based on the attribute distance of the respective neighboring point, the weight for the reconstructed attribute value of the respective neighboring point being inversely proportional to the attribute distance of the respective neighboring point;

determining an attribute prediction of the current point based on the weights of the reconstructed attribute values of the neighboring points; and combining the attribute prediction of the current point with a residual signal of the current point to obtain a reconstructed attribute value of the current point.

* * * * *